US012549062B2

(12) United States Patent
Roberts

(10) Patent No.: US 12,549,062 B2
(45) Date of Patent: Feb. 10, 2026

(54) ELECTRIC MOTOR WITH INTERNAL BRAKE ASSEMBLY

(71) Applicant: Eaton Intelligent Power Limited, Dublin (IE)

(72) Inventor: Daniel Henry Roberts, Monrovia, CA (US)

(73) Assignee: Eaton Intelligent Power Limited, Dublin (IE)

( * ) Notice: Subject to any disclaimer, the term of this patent is extended or adjusted under 35 U.S.C. 154(b) by 320 days.

(21) Appl. No.: 18/188,661

(22) Filed: Mar. 23, 2023

(65) Prior Publication Data
US 2023/0307989 A1 Sep. 28, 2023

Related U.S. Application Data

(60) Provisional application No. 63/323,019, filed on Mar. 23, 2022.

(51) Int. Cl.
*H02K 7/102* (2006.01)
*B64C 13/50* (2006.01)
(Continued)

(52) U.S. Cl.
CPC ............ *H02K 7/102* (2013.01); *B64C 13/50* (2013.01); *F16D 41/02* (2013.01); *F16D 55/36* (2013.01); *F16D 65/18* (2013.01); *H02K 7/088* (2013.01); *H02K 7/112* (2013.01); *H02K 7/116* (2013.01); *F16D 2121/22* (2013.01); *F16H 49/001* (2013.01)

(58) Field of Classification Search
CPC ..... H02K 7/102; H02K 7/1021; H02K 7/1023
See application file for complete search history.

(56) References Cited

U.S. PATENT DOCUMENTS 3,582,741 A * 6/1971 Arnold ................... H02K 7/102
 318/371
9,735,647 B2 8/2017 DeFosse
 (Continued)

FOREIGN PATENT DOCUMENTS

DE 102007039239 A1 * 7/2009 ............. H02K 7/125
DE 102013224149 A1 * 5/2015 ............. B60L 50/51

OTHER PUBLICATIONS

DE-102013224149-A1 Machine Translation (Year: 2015).*
(Continued)

*Primary Examiner* — Oluseye Iwarere
*Assistant Examiner* — Masoud Vaziri
(74) *Attorney, Agent, or Firm* — Merchant & Gould P.C.

(57) ABSTRACT

An electric motor-brake assembly includes a housing within which a rotor assembly, a stator assembly, and a brake assembly are disposed. The brake assembly is operable between an engaged state and a disengaged state. The rotor assembly is axially movable within the housing and is supported by bearings supporting both radial and axial loads. When the motor stator is de-energized, the brake assembly is in the engaged state to prevent the rotor assembly from rotating in at least one rotational direction. When the motor stator is energized, the brake assembly is in the disengaged state such that the rotor assembly is free to rotate. The brake assembly can include a friction pack that is engaged and disengaged by axial displacement of the rotor assembly.

17 Claims, 7 Drawing Sheets

(51) Int. Cl.
*F16D 41/02* (2006.01)
*F16D 55/36* (2006.01)
*F16D 65/18* (2006.01)
*H02K 7/08* (2006.01)
*H02K 7/112* (2006.01)
*H02K 7/116* (2006.01)
*F16D 121/22* (2012.01)
*F16H 49/00* (2006.01)

(56) References Cited

U.S. PATENT DOCUMENTS

| | | | | |
|---|---|---|---|---|
| 2005/0174002 A1* | 8/2005 | Sesselmann | ............ | H02K 7/102 |
| | | | | 310/77 |
| 2017/0141647 A1* | 5/2017 | Defosse | ................. | H02K 7/003 |
| 2019/0089224 A1* | 3/2019 | Hatani | .................... | H02K 21/14 |
| 2020/0139544 A1* | 5/2020 | Negishi | .................. | H02P 23/00 |
| 2020/0235636 A1* | 7/2020 | Miyazawa | ............... | B25J 9/102 |
| 2020/0307818 A1* | 10/2020 | Dubreuil | ................ | H02K 7/108 |

OTHER PUBLICATIONS

DE-102007039239-A1 Machine Translation (Year: 2009).*
Extended European Search Report for European Application No. 23163817.2 dated Aug. 1, 2023.

* cited by examiner

ELECTRIC MOTOR WITH INTERNAL BRAKE ASSEMBLY

RELATED APPLICATIONS

This application claims priority to U.S. Provisional Patent Application Ser. No. 63/323,019, filed on Mar. 23, 2022, the entirety of which is incorporated by reference herein.

TECHNICAL FIELD

The present disclosure relates generally to electric motors and systems.

BACKGROUND

More-electric aircraft and all-electric aircraft are increasingly becoming more relevant in the aerospace industry. Although actuators in aircraft control mechanisms have conventionally been hydraulic/mechanical systems, electrical drive systems (EDS) including an electric motor and an electric drive are gaining interest in aerospace applications due to growing demands for more/all-electric aircrafts. In some implementations, a flight control actuation system using electric motors and drives can be used to move the aircraft flight control surfaces to respective commanded positions. Typical flight control surfaces include ailerons, flaps, slats, and spoilers. In some implementations, an external brake assembly is provided to lock the position of the motor, such as a solenoid-type brake attached to the motor shaft. Motor applications with external braking systems exist in other industries as well. Improvements are desired.

SUMMARY

An electric motor-brake assembly can include a motor housing; a rotor assembly disposed within the motor housing and being axially displaceable between a first position and a second position; a stator assembly disposed within the motor housing; a bearing assembly rotatably supporting the rotor assembly; a friction pack disposed within the motor housing; and a spring pack biasing the rotor assembly in a direction towards the friction pack; wherein, when electrical coils of the motor are de-energized, a spring force provided by the spring pack holds the rotor assembly in the first position and in engagement with the friction pack to prevent the rotor assembly from rotating in at least one rotational direction; wherein, when the electrical coils of the motor are energized, the rotor assembly is moved relative to the stator assembly into the second position against the spring force of the spring pack and out of engagement with the friction pack such that the rotor assembly is free to rotate.

In some examples, the spring pack is disposed between the motor housing and the bearing assembly.

In some examples, the bearing assembly includes a first bearing assembly located at a first axial end of the rotor assembly and a second bearing assembly located at a second axial end of the rotor assembly.

In some examples, the rotor assembly is disposed within an interior area defined by the stator assembly.

In some examples, the friction pack is disposed within an interior area defined by the rotor assembly.

In some examples, the rotor assembly and stator assembly are constructed and arranged to form an induction motor.

In some examples, a stator housing is secured to the motor housing.

In some examples, the friction pack includes a plurality of rotor plates assembled to a spline on the rotor assembly and a plurality of stator plates assembled to a spline on the stator housing.

In some examples, a clutch assembly is disposed between the friction pack and the rotor assembly; wherein, when the rotor assembly is in the first position, the clutch assembly allows the rotor assembly to rotate in a first rotational direction and prevents the rotor assembly from rotating in a second rotational direction.

An electric motor-brake assembly can include a motor housing; a rotor assembly disposed within the motor housing and being axially displaceable between a first position and a second position; a stator assembly disposed within the motor housing; a bearing assembly rotatably supporting the rotor assembly; a friction pack disposed within the motor housing; and a clutch assembly disposed between the friction pack and the rotor assembly; a spring pack biasing the rotor assembly in a direction towards the friction pack; wherein, when electrical coils of the motor are de-energized, a spring force provided by the spring pack holds the rotor assembly in the first position and in engagement with the friction pack to prevent the rotor assembly from rotating in a first rotational direction while the clutch assembly allows the rotor assembly to rotate in an opposite second rotational direction; wherein, when the electrical coils of the motor are energized, the rotor assembly is moved relative to the stator assembly into the second position against the spring force of the spring pack and out of engagement with the friction pack such that the rotor assembly is free to rotate.

In some examples, the spring pack is disposed between the motor housing and the bearing assembly.

In some examples, the bearing assembly includes a first bearing assembly located at a first axial end of the rotor assembly and a second bearing assembly located at a second axial end of the rotor assembly.

In some examples, the rotor assembly is disposed within an interior area defined by the stator assembly.

In some examples, the friction pack is disposed within an interior area defined by the rotor assembly.

In some examples, the rotor assembly and stator assembly are constructed and arranged to form an induction motor.

In some examples, a stator housing is secured to the motor housing.

In some examples, the friction pack includes a plurality of rotor plates assembled to a spline on the clutch assembly and a plurality of stator plates assembled to a spline on the stator housing.

In some examples, the clutch assembly is a sprag clutch assembly.

An electric motor-brake assembly can include a housing; a rotor assembly disposed within the housing; a stator assembly disposed within the housing; a brake assembly disposed within the housing, the brake assembly being operable between an engaged state and a disengaged state; wherein, when coils of the motor are de-energized, the brake assembly is in the engaged state to prevent the rotor assembly from rotating in at least one rotational direction; wherein, when the coils of the motor are energized, the brake assembly is in the disengaged state such that the rotor assembly is free to rotate.

In some examples, the brake assembly is spring biased towards the engaged state.

In some examples, a spring pack is disposed between the motor housing and the bearing assembly.

In some examples, the rotor assembly is axially displaceable between a first axial position and a second axial position, wherein the brake assembly is in the engaged state in the first axial position and is in the disengaged state in the second axial position.

In some examples, the brake assembly is located radially between the rotor assembly and the stator assembly.

In some examples, the brake assembly is a friction pack including a plurality of rotor plates assembled to a spline on a clutch assembly and a plurality of stator plates assembled to a spline on the stator housing.

In some examples, a bearing assembly is provided and includes a first bearing assembly located at a first axial end of the rotor assembly and a second bearing assembly located at a second axial end of the rotor assembly.

In some examples, the rotor assembly is disposed within an interior area defined by the stator assembly.

In some examples, the friction pack is disposed within an interior area defined by the rotor assembly.

In some examples, the rotor assembly and stator assembly are constructed and arranged to form an induction motor.

In some examples, a stator housing is secured to the motor housing.

In some examples, a clutch assembly is disposed between the brake assembly and the rotor assembly; wherein, when the brake assembly is in the engaged state, the clutch assembly allows the rotor assembly to rotate in a first rotational direction and prevents the rotor assembly from rotating in a second rotational direction.

A control surface actuation system for an aircraft can include a control surface; an operating member connected to the control surface; an electric motor assembly configured and arranged to drive the operating member. The electric motor assembly can include a housing; an output shaft operably engaged with the operating member; a rotor assembly disposed within the housing, the rotor assembly driving the output shaft; a stator assembly disposed within the housing; a brake assembly disposed within the housing, the brake assembly being operable between an engaged state and a disengaged state; wherein, when coils of the motor are de-energized, the brake assembly is in the engaged state to prevent the output shaft from rotating in at least one rotational direction to fix a position of the control surface; wherein, when the coils of the motor are energized, the brake assembly is in the disengaged state such that the output shaft is free to rotate.

In some examples, the control surface is a spoiler of an aircraft.

In some examples, the an output shaft is operably coupled with the rotor assembly, wherein the stator assembly is located radially between the output shaft and the rotor assembly.

In some examples, the output shaft is operably coupled to the rotor assembly by a wave gearing arrangement.

A variety of additional aspects will be set forth in the description that follows. The aspects relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure.

DETAILED DESCRIPTION

Figure 1:
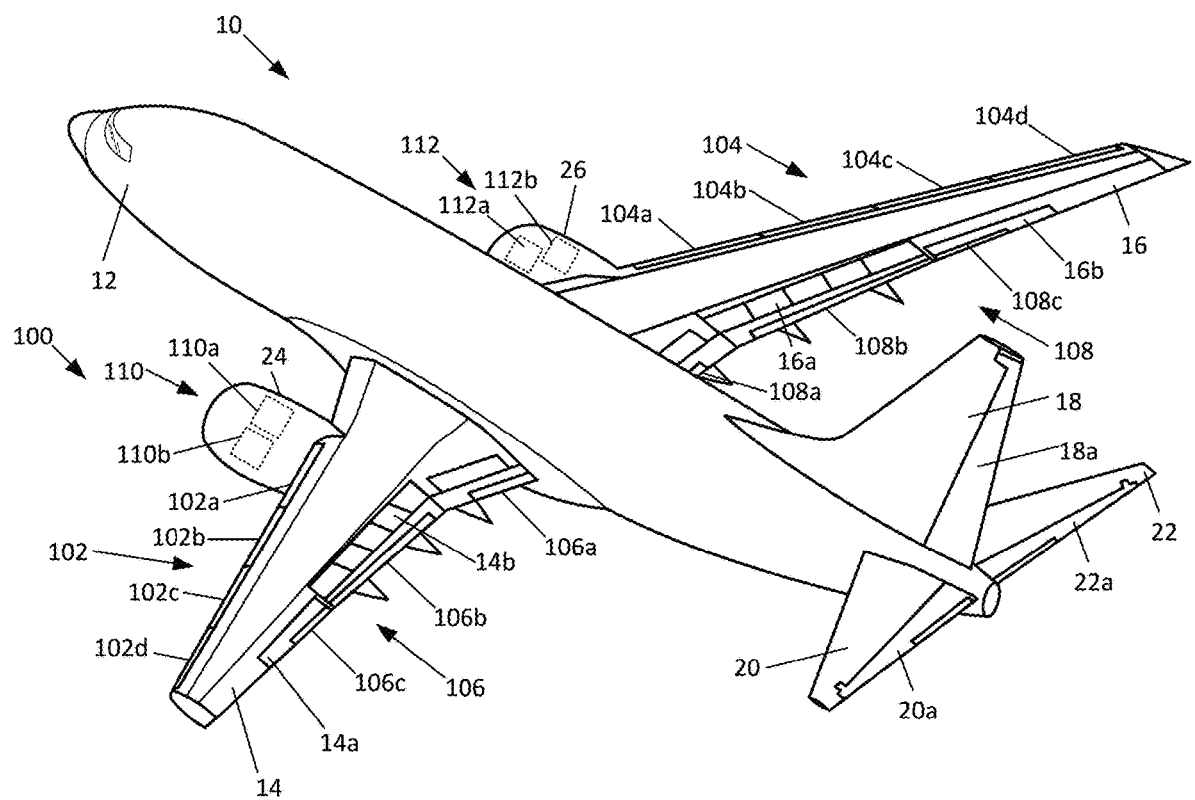
FIG. 1 is a schematic view of an aircraft having features that are examples of aspects in accordance with principles of the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several Figures.

Aircraft 10

Referring to FIG. 1, a schematic representation of an example aircraft 10 is presented. In general terms, the aircraft 10 includes a fuselage 12, left and right wings 14, 16, a vertical stabilizer 18, and left and right horizontal stabilizers 20, 22. The aircraft 10 is also provided with a number of primary flight control surfaces for operating the aircraft 10 during flight. Examples of such primary flight control surfaces are ailerons 14a, 16a and spoilers 14b, 16b associated with the left and right wings 14, 16, a rudder 18a associated with the vertical stabilizer 18, and elevators 20a, 22a associated with the left and right horizontal stabilizers 20, 22. The aircraft 10 is also shown as being provided with jet engines 24, 26 respectively associated with the left and right wings 14, 16. The aircraft 10 is also provided with a number of secondary control surfaces 100 which are generally used during take-off and landing procedures. Examples of such secondary control surfaces 100 are slats 102 (102a-102d) and flaps 106 (106a-106c) associated with the left wing 14, slats 104 (104a-104d) and flaps 108 (108a-108c) associated with the right wing 16, and thrust reversers 110 (110a, 110b), 112 (112a, 112b) respectively associated with the left and right engines 24, 26.

In one example use of the secondary control surfaces, the slats 102, 104 and flaps 106, 108 can be extended during takeoff to increase the overall size and lift of the wings 14, 16. In the extended position, the slats 102, 104 and flaps 106, 108 greatly increase the lift generated by the wings 14, 16 which in turn enables the aircraft 10 to take off more capably and under heavier loads. When takeoff is complete and the aircraft 10 enters a cruising phase, the slats 102, 104 and flaps 106, 108 can be retracted to reduce drag on the wings 14, 16 and therefore allow for more efficient operation. The slats 102, 104 and/or flaps 106, 108 can also be used during the landing procedure to reduce the required distance and speed to safely land the aircraft 10. In one aspect, the slats 102, 104 and flaps 106, 108 can be characterized as being high-lift devices.

In another example use of the secondary control surfaces, the thrust reversers 110, 112 can be activated into an extended position to temporarily divert the thrust of the engines 24, 26. By activating the thrust reversers 110, 112, the diverted thrust acts against the forward direction of the aircraft 10 to provide deceleration just after touch-down such that the diverted thrust acts against the forward travel of the aircraft. The incorporation of thrust reversers 110, 112 therefore enables the aircraft 10 to land over a shorter distance and reduces the wear on the brakes of the aircraft 10. In one aspect, the thrust reversers 110, 112 can be characterized as forming part of a thrust reverser actuation system (TRAS).

Although one example of an aircraft 10 is presented with three examples of secondary control surfaces 100 (e.g., slats 102/104, flaps 106/108, thrust reversers 110/112), many other configurations of the aircraft 10 and secondary control surfaces 100 are possible without departing from the concepts presented herein.

Figure 2:
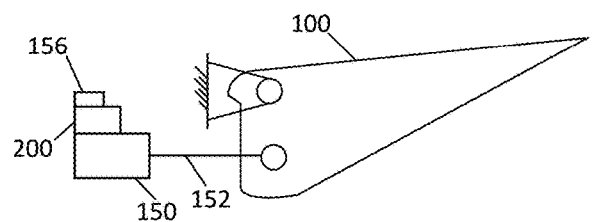
FIG. 2 is a schematic showing an example control surface actuation system of the aircraft shown in FIG. 1.
Figure 3:
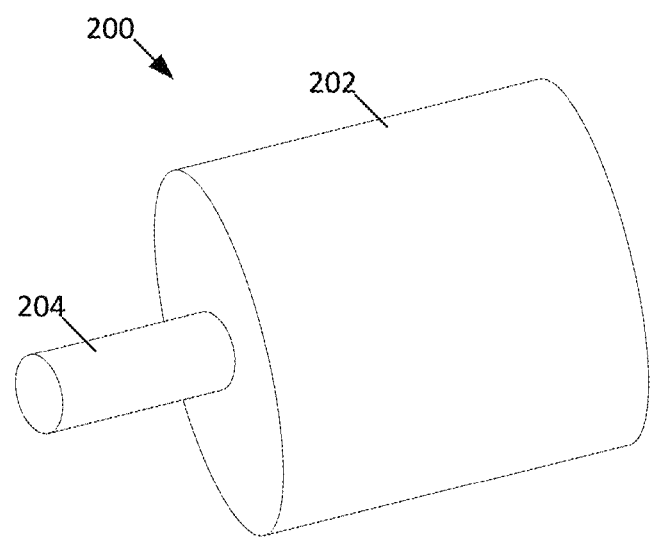
FIG. 3 is a schematic view of a motor assembly of the control surface actuation system shown in FIG. 1.

Referring to FIG. 2, a schematic is presented showing a control surface actuation system usable to operate control surfaces 100 of the aircraft 10, including but not limited to, the above-described primary and secondary control surfaces. As shown at FIG. 2, a control surface 100 is presented, wherein the control surface 100 is driven by an actuator 150. In some examples, multiple actuators can be used to drive a single control surface. In some examples, a single actuator can be used to drive multiple control surfaces. In one aspect, the actuator 150 drives the control surface 100 by operating a member 152 operably connected to the control surface 100. Each actuator 150 is shown as being an electromechanical actuator 150 driven by a motor assembly 200 via, for example, a controller 156. The actuator 150 can be, for example, a linear acting actuator with a linear screw driven by the motor assembly 200. In some examples, the member 152 is operably connected to the actuator 150 via a gear set, such as a planetary gear set. In some examples, the member 152 is a part of the actuator 150, such as a shaft of the actuator 150. The control surface 100 of FIG. 2 can correspond to any of the control surfaces 14a/b, 16a/b, 18a, 20a, 22a, 102, 104, 106, 108 shown in FIG. 1.

Motor 200

Referring to FIGS. 3 to 7, examples of a motor assembly 200 is presented. In one aspect, the motor assembly 200 includes a motor housing assembly 202 and a motor output 204. The motor output 204 can be configured as desired, such as a shaft, flange, or gear. In the example shown in the drawings, the motor output 204 is an output shaft 204. However, the disclosure is equally applicable to an out-runner motor configuration. The motor housing assembly 202 can be characterized as including a main housing 202a and a stator housing 202b. As most easily seen at FIG. 4, the motor output 204 is formed with or connected to a rotor assembly 206 which is rotatably disposed within the motor housing 202 such that the motor output 204 and rotor assembly 206 rotate about a longitudinal axis X. The motor assembly 200 is further provided with a stator assembly 208 with a plurality of electrical windings or coils. In the example shown, the rotor assembly 206 is positioned interiorly within an area defined by the stator assembly 208. The rotor assembly can be provided with electrical conductors, windings, or magnets depending upon the type of motor. Non-limiting examples of motor types suitable for the motor assembly 200 are permanent magnet synchronous motors and brushless DC motors.

The motor assembly 200 may be configured as either an in-runner motor (i.e., internal rotor motor) or an out-runner motor (i.e., external rotor motor) without departing from the concepts herein. In the example shown, the motor assembly 200 is presented as an in-runner motor configuration, wherein the rotor and magnets are located within an area defined by the stator coils. The motor assembly 200 may also be configured as an out-runner motor in which the stator coils are located within an area defined by the rotor and magnets. In such a configuration, the upper cross-sectional half of the motor assembly could be configured similarly to the bottom half of the cross-sections at FIGS. 5 and 6, while the lower cross-sectional half of the motor assembly could be configured similarly to the upper half of the cross-sections at FIGS. 5 and 6.

In one aspect, the electrical length of the stator assembly 208 is greater than that of the rotor assembly 206, and a means (e.g., a spring) is provided to hold the rotor axially away from magnetic center (equilibrium) while the stator coils are not energized. As a result, when the stator coils are energized, the rotor assembly 206 is pulled in a first axial direction A1 towards and into a magnetic center of the motor assembly.

In one aspect, a bearing assembly 210, including a first bearing assembly 210a, supported at the main housing 202a, and a second bearing assembly 210b, supported at the stator housing 202b, is provided to rotatably support the rotor assembly 206. In one aspect, the bearing assembly 210 is configured to support both axial and radial loads.

The motor assembly 200 is further provided with a spring pack arrangement 212, including a first spring pack 212a, axially disposed between the main housing 202a and the first bearing assembly 210a, and a second spring pack 212b, axially disposed between the stator housing 202b and the second bearing assembly 210b. The spring pack arrangement 212 enables the rotor assembly 206 to travel in an axial direction (i.e., a direction parallel to the longitudinal axis X) between a first axial position, as shown in the drawings, and a second axial position. The second axial position is in the direction A1 or in the left direction as shown in the drawings, relative to the first axial position. In one aspect, the first spring pack 212a exerts a greater force than the second spring pack 212b such that the spring pack arrangement 212, as a whole, biases the rotor assembly 206 in an axial direction opposite the first axial direction A1 and into the first axial position. In one aspect, the spring packs 212a, 212b including a plurality of circumferentially arranged springs acting on axial faces of the housings 202a, 202b and bearing assemblies 210a, 210b, respectively.

Figure 4:
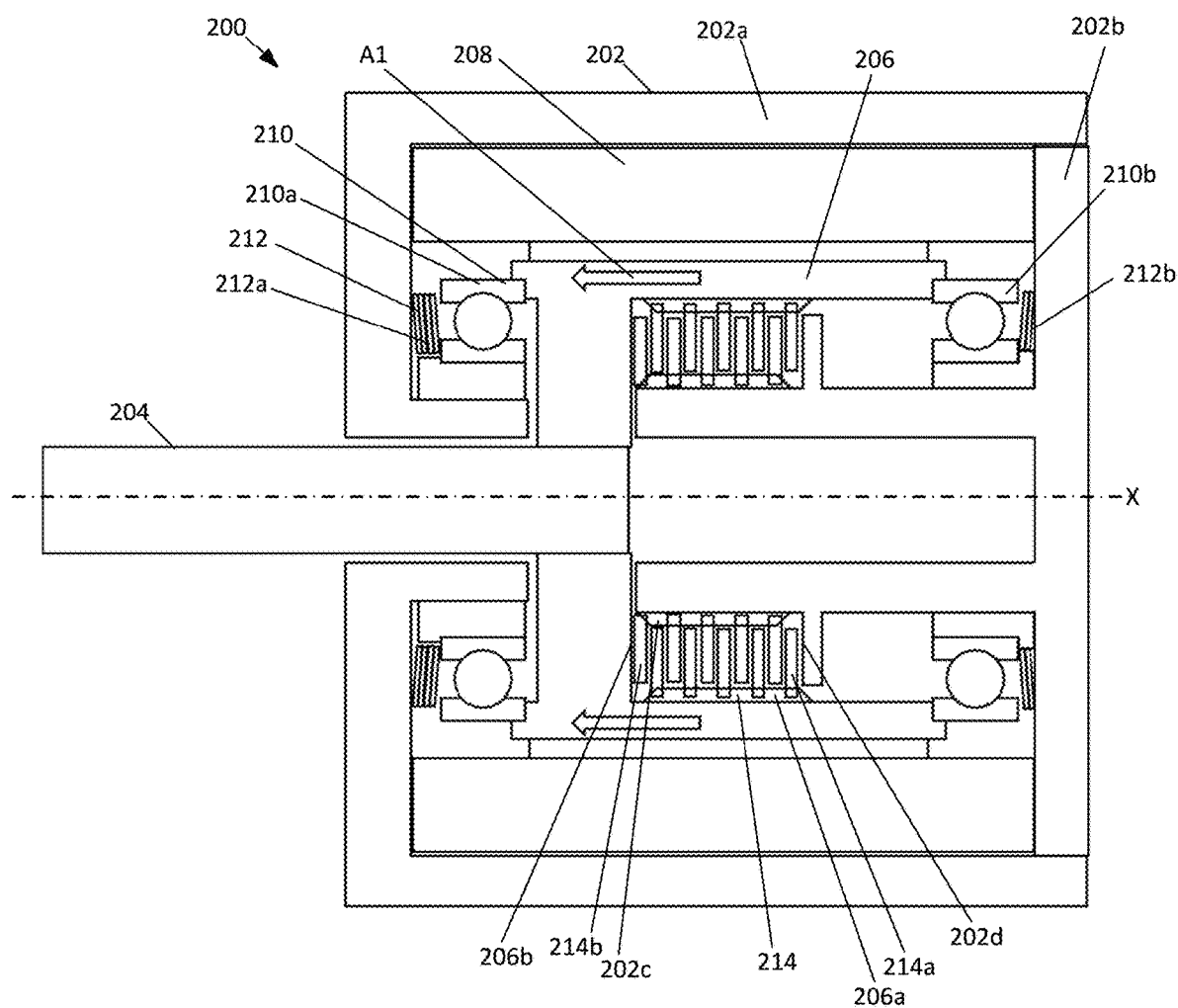
FIG. 4 is a schematic cross-sectional view of the motor assembly shown in FIG. 3.

Still referring to FIG. 4, the motor assembly 200 is provided with a brake assembly 214. In the example shown, the brake assembly 214 is disposed within an interior area defined by the rotor assembly 206 such that the brake assembly 214 is radially located between the rotor assembly 206 and the longitudinal axis X. The brake assembly 214, when engaged, prevents rotation of the rotor assembly 206. In the example shown, the brake assembly 214 is configured as a friction pack including a plurality of alternating annular rotor plates 214a and stator plates 214b. As shown, the rotor plates 214a are slidably secured to the rotor assembly 206 via a plurality of splines 206a provided on the rotor assembly 206. As such, the rotor plates 214a rotate with the rotor assembly 206. The stator plates 214a are similarly splined to the stator housing 202b via a plurality of splines 202c.

When the stator coil is deenergized, the net biasing force of the spring pack 212 moves the rotor assembly 206 into the first axial position such that the rotor plates 214a and stator plates 214b are axially compressed together between an axial face or surface 206b of the rotor assembly 206 and an axial face or surface 202d of the stator housing 202b. The resulting friction between the plates 214a, 214b prevents relative rotation of the rotor assembly 206 with respect to the stator housing 202b, and thus the housing 202. As such, the brake assembly 214 can be said to be in an engaged state when the rotor assembly 206 is in the first axial position. When the stator coil is energized, the rotor assembly 206 is pulled in the axial direction A1 towards its magnetic center and into the second axial position such that the rotor plates 214a, 214b are no longer compressed together and the rotor assembly 206 can rotate without resistance from the brake assembly 214. Accordingly, the motor assembly 200 is configured such that the position of the motor output 204 is locked when the motor assembly 200 is deenergized.

Figure 5:
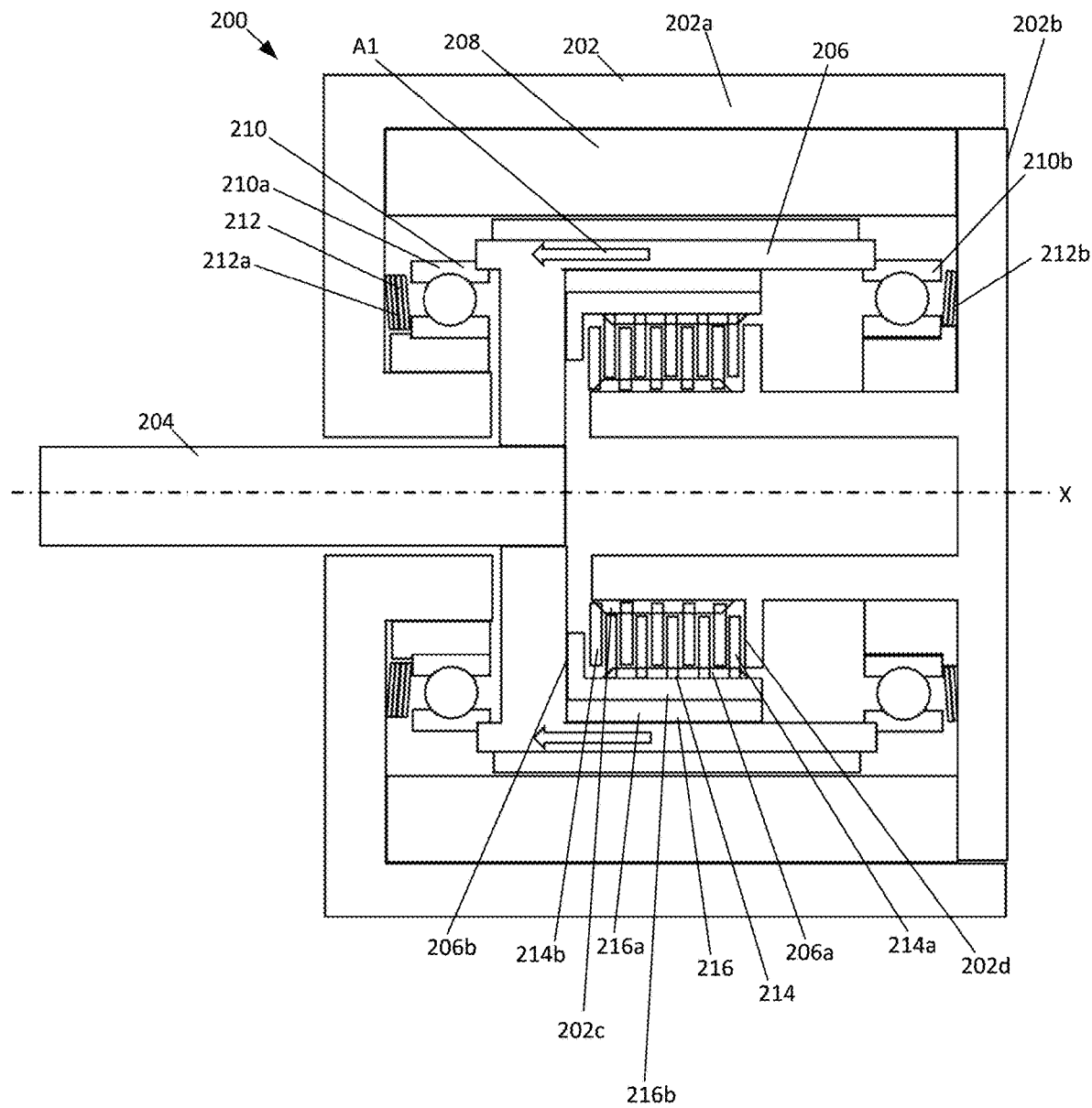
FIG. 5 is a schematic cross-sectional view of a variation of the motor assembly shown in FIG. 3.

Referring to FIG. 5, a variation of the motor assembly 200 is shown in which an additional clutch assembly 216 is provided between the rotor assembly 206 and the brake assembly 214. In one aspect, the clutch assembly 216 includes a first part 216a, secured to the rotor assembly 206, and a second part 216b rotatably secured to the first part 216a. The clutch assembly 216 is configured such that relative rotation between the first and second parts 216a, 216b is enabled in one direction while be prevented in the opposite direction. In the arrangement depicted, the splines 206a are provided on the second part 216b of the clutch assembly 216 such that, when the rotor assembly 206 is in the first axial position, the brake assembly 214 operates to lock or ground the clutch assembly 216 relative to the stator housing 202b. Thus, when the rotor assembly 206 is in the first axial position, the rotor assembly 206 is allowed to rotate in a first rotational direction while being prevented from rotating in an opposite second rotational direction. When the rotor assembly 206 is in the second axial position, the brake assembly 214 is disengaged such that the second part 216b of the clutch assembly 216 no longer interacts with the stator housing 202b. Accordingly, in the second axial position, the clutch assembly 216 does not operably act on the rotor assembly 206, thereby enabling the rotor assembly 206 to rotate in either the first or second rotational directions. In one example, the clutch assembly 216 is a sprag type clutch.

Figure 6:
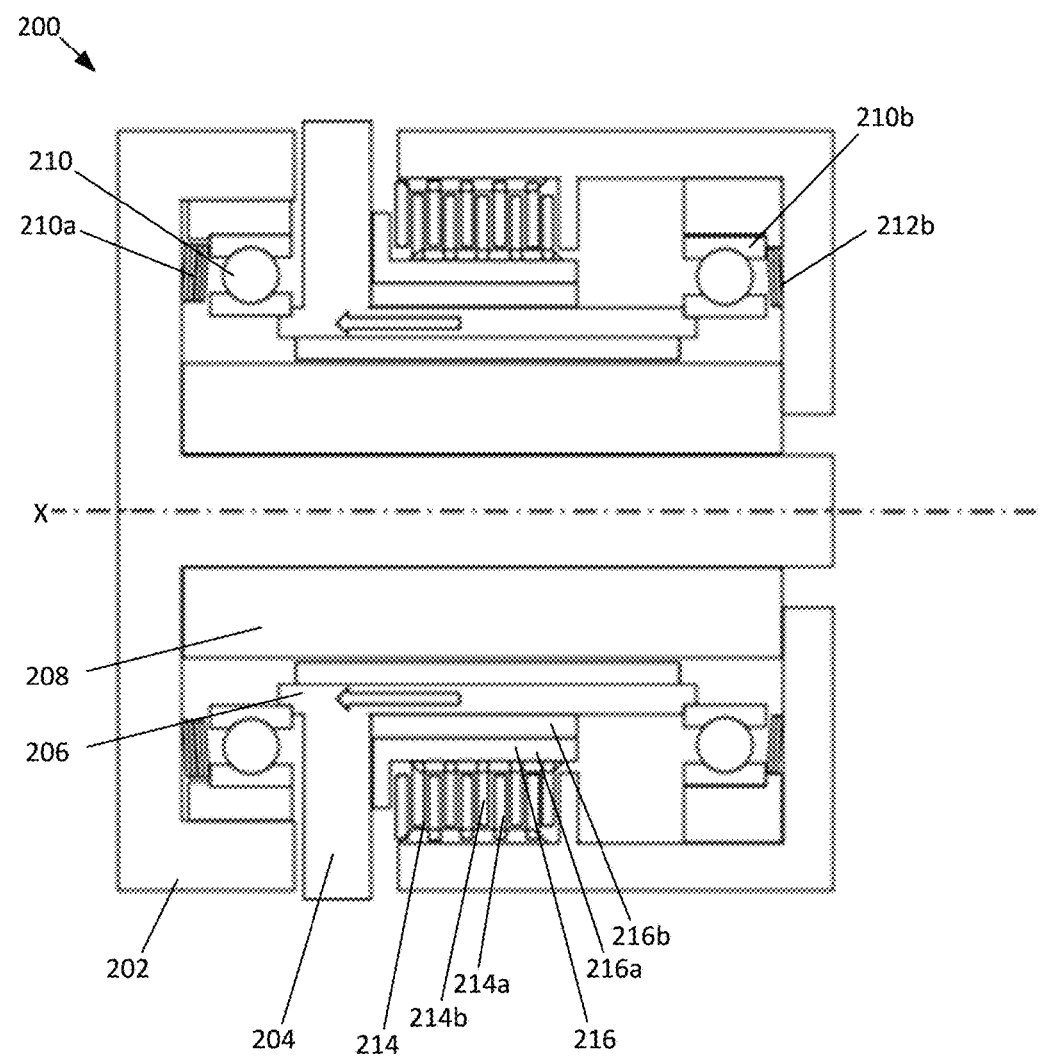
FIG. 6 is a schematic cross-sectional view of a variation of the motor assembly shown in FIG. 3.

Referring to FIG. 6, an example motor assembly 200 is presented. Similar to the example presented at FIGS. 5, the motor assembly 200 of FIG. 6 includes a housing 202, a shaft 204, a stator assembly 208, a rotor assembly 206, bearing assemblies 210, a spring pack arrangement 212, a brake assembly 214, and a clutch assembly 216. Accordingly, the previously provided descriptions for commonly shared components and configurations need not be repeated here. Rather, the description of the example presented at FIG. 6 will focus on the relevant differences over the previously described examples. In one aspect, the motor assembly 200 of FIG. 6 is provided in an outrunner type configuration in which the rotor assembly 206 circumscribes the stator assembly 208 and has a circumferential or radial output component 204, rather than the central shaft shown in FIG. 5. In such a configuration, the clutch assembly 216 circumscribes the rotor assembly 206 while the brake assembly 214 circumscribes the clutch assembly 216.

Figure 7:
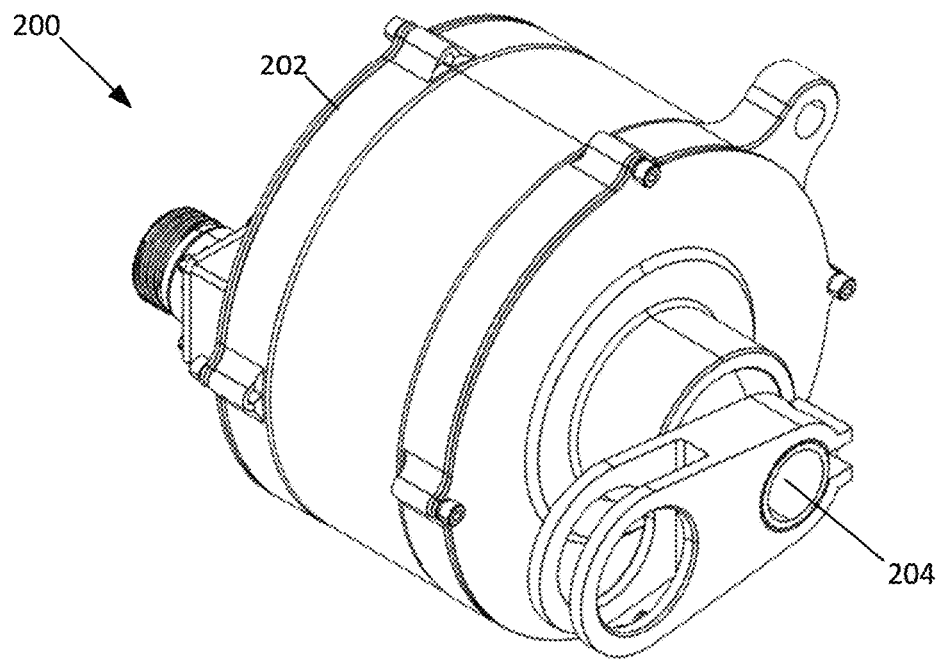
FIG. 7 is a schematic first perspective view of a variation of the motor assembly shown in FIG. 3.
Figure 8:
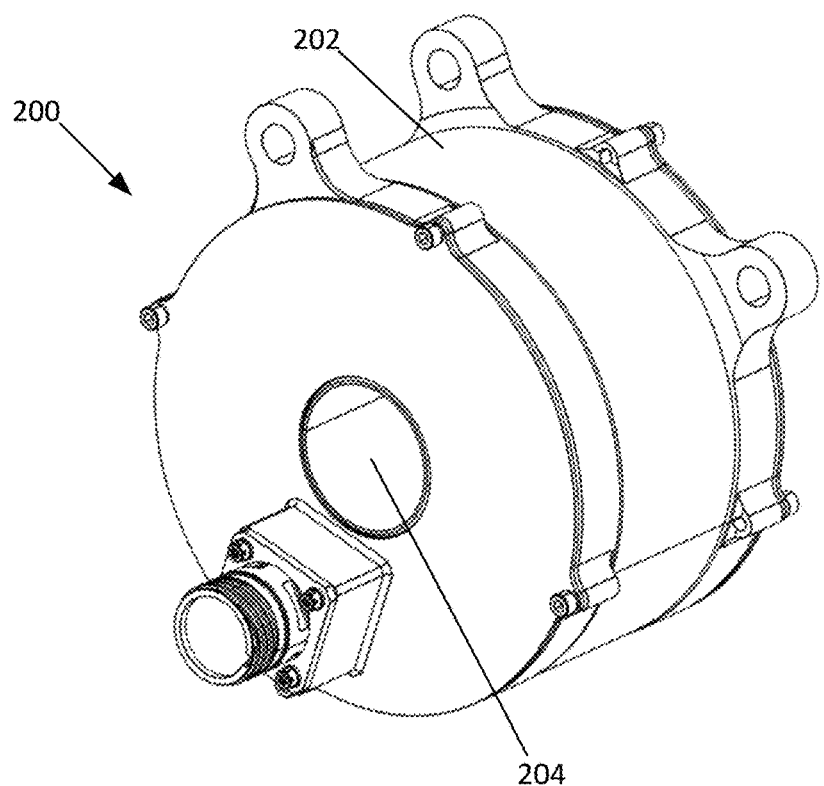
FIG. 8 is a schematic second perspective view of the motor assembly shown in FIG. 7.
Figure 9:
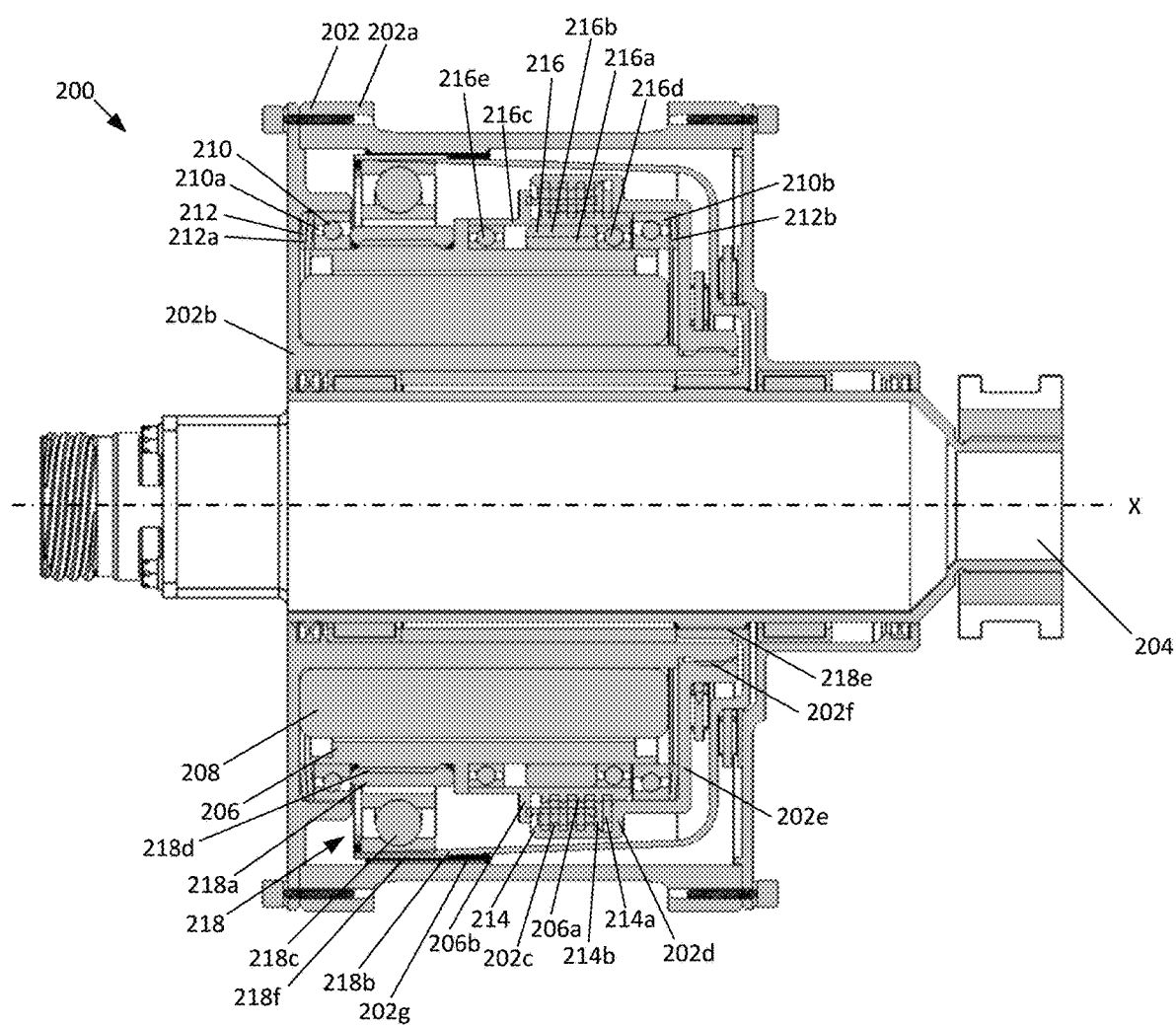
FIG. 9 is a schematic cross-sectional view of the motor assembly shown in FIG. 7.

Referring to FIGS. 7-9, an example motor assembly 200 is presented. Similar to the examples presented at FIGS. 5 and 6, the motor assembly 200 of FIGS. 7-9 includes a housing 202, a shaft 204, a stator assembly 208, a rotor assembly 206, bearing assemblies 210, a spring pack arrangement 212, a brake assembly 214, and a clutch assembly 216. Accordingly, the previously provided descriptions for commonly shared components and configurations need not be repeated here. Rather, the description of the example presented at FIGS. 7-9 will focus on the relevant differences over the previously described examples. In one aspect, the motor assembly 200 of FIGS. 7-9 is provided in an outrunner type configuration similar to FIG. 6, but is provided with a central shaft 204 similar to FIG. 5. To facilitate such a configuration, the housing assembly 200 is provided with an intermediate housing structure 202e engaged with the housing portion 202b via a splined connection 202f, wherein the intermediate housing structure 202e supports splines 202c and axial surface 202d. The intermediate housing structure 202e is also shown as supporting bearing assembly 210b and spring arrangement 212b. While the intermediate housing structure 202e is shown as being a separate component, it is possible that the intermediate housing structure 202e could be integrally formed with other components of the housing assembly 202. In the example shown at FIGS. 7-9, the clutch assembly 216 is shown in greater detail and in a configuration in which the first part 216a is splined to the rotor assembly 206 and the second part 216b is splined to an intermediate annular structure 216c defining the splines 206a and axial surface 206b. The clutch assembly 216 is also shown as being provided with bearing assemblies 216d, 216e facilitating rotational movement between the intermediate housing structure 216c and the rotor assembly 206. In one aspect, torque is transmitted from the rotor assembly 206 to the output shaft 204 via a wave gearing arrangement 218 including a wave generator component 218a connected to the rotor assembly 206, a flexible spline component 218b, and a bearing assembly 218c disposed between the wave generator component 218a and the flexible spline component 218b. The wave gearing arrangement may be referred to as a strain wave gearing arrangement or a harmonic gearing arrangement. In one aspect, wave generator component 218a has an elliptical or non-circular shape and is connected to the rotor assembly 206 at a splined connection 218d. In one aspect, the flexible spline component 218b is splined to the output shaft 204 at a splined connection 218e. The flexible spline component 218c is provided with external splines 218f that engage with corresponding inwardly facing splines 202g on the housing 202 as the flexible spline component 218 is deformed by rotation of the rotor assembly 202 and the elliptical wave generator component 218a. Through this arrangement, rotation of the rotor assembly 206 effectuates rotation of the output shaft 204.

Although this disclosure, covers certain motor types and certain geometries, the general cooling ideas area also applicable to other motor topologies and geometries. Further, although an aerospace or aircraft implementation is shown and described, the inventive concepts presented herein are applicable to other industries and applications.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

Aspects

Examples of the disclosure may be described according to the following aspects.

Aspect 1. An electric motor-brake assembly comprising: a motor housing; a rotor assembly disposed within the motor housing and being axially displaceable between a first position and a second position; a stator assembly disposed within the motor housing; a bearing assembly rotatably supporting the rotor assembly; a friction pack disposed within the motor housing; and a spring pack biasing the rotor assembly in a direction towards the friction pack; wherein, when electrical coils of the motor are de-energized, a spring force provided by the spring pack holds the rotor assembly in the first position and in engagement with the friction pack to prevent the rotor assembly from rotating in at least one rotational direction; wherein, when the electrical coils of the motor are energized, the rotor assembly is moved relative to the stator assembly into the second position against the spring force of the spring pack and out of engagement with the friction pack such that the rotor assembly is free to rotate.

Aspect 2. The electric motor-brake assembly of Aspect 1, wherein the spring pack is disposed between the motor housing and the bearing assembly.

Aspect 3. The electric motor-brake assembly of Aspect 1 or 2, wherein the bearing assembly includes a first bearing assembly located at a first axial end of the rotor assembly and a second bearing assembly located at a second axial end of the rotor assembly.

Aspect 4. The electric motor-brake assembly of any preceding Aspect, wherein the rotor assembly is disposed within an interior area defined by the stator assembly or an interior area defined by the rotor assembly.

Aspect 5. The electric motor-brake assembly of any preceding Aspect, wherein the friction pack is disposed within an interior area defined by the rotor assembly or an interior area defined by the stator assembly.

Aspect 6. The electric motor-brake assembly of any preceding Aspect, wherein the rotor assembly and stator assembly are constructed and arranged to form a permanent magnet motor.

Aspect 7. The electric motor-brake assembly of any preceding Aspect, further comprising a stator housing secured to the motor housing.

Aspect 8. The electric motor-brake assembly of Aspect 7, wherein the friction pack includes a plurality of rotor plates assembled to a spline on the rotor assembly and a plurality of stator plates assembled to a spline on the stator housing.

Aspect 9. The electric motor-brake assembly of any of Aspect 1 to 8, further comprising: a clutch assembly disposed between the friction pack and the rotor assembly; wherein, when the rotor assembly is in the first position, the clutch assembly allows the rotor assembly to rotate in a first rotational direction and prevents the rotor assembly from rotating in a second rotational direction.

Aspect 10. An electric motor-brake assembly comprising: a motor housing; a rotor assembly disposed within the motor housing and being axially displaceable between a first position and a second position; a stator assembly disposed within the motor housing; a bearing assembly rotatably supporting the rotor assembly; a friction pack disposed within the motor housing; and a clutch assembly disposed between the friction pack and the rotor assembly; a spring pack biasing the rotor assembly in a direction towards the friction pack; wherein, when electrical coils of the motor are de-energized, a spring force provided by the spring pack holds the rotor assembly in the first position and in engagement with the friction pack to prevent the rotor assembly from rotating in a first rotational direction while the clutch assembly allows the rotor assembly to rotate in an opposite second rotational direction; wherein, when the electrical coils of the motor are energized, the rotor assembly is moved relative to the stator assembly into the second position against the spring force of the spring pack and out of engagement with the friction pack such that the rotor assembly is free to rotate.

Aspect 11. The electric motor-brake assembly of Aspect 10, wherein the spring pack is disposed between the motor housing and the bearing assembly.

Aspect 12. The electric motor-brake assembly of Aspect 10 or 11, wherein the bearing assembly includes a first bearing assembly located at a first axial end of the rotor assembly and a second bearing assembly located at a second axial end of the rotor assembly.

Aspect 13. The electric motor-brake assembly of any preceding Aspect, wherein the rotor assembly is disposed within an interior area defined by the stator assembly or an interior area defined by the rotor assembly.

Aspect 14. The electric motor-brake assembly of any preceding Aspect, wherein the friction pack is disposed within an interior area defined by the rotor assembly or an interior area defined by the stator assembly.

Aspect 15. The electric motor-brake assembly of any preceding Aspect, wherein the rotor assembly and stator assembly are constructed and arranged to form an permanent magnet.

Aspect 16. The electric motor-brake assembly of any preceding claim, further comprising a stator housing secured to the motor housing.

Aspect 17. The electric motor-brake assembly of Aspect 16, wherein the friction pack includes a plurality of rotor plates assembled to a spline on the clutch assembly and a plurality of stator plates assembled to a spline on the stator housing.

Aspect 18. The electric motor-brake assembly of any preceding Aspect, wherein the clutch assembly is a sprag clutch assembly.

Aspect 19. An electric motor-brake assembly comprising: a housing; a rotor assembly disposed within the housing; a stator assembly disposed within the housing; a brake assembly disposed within the housing, the brake assembly being operable between an engaged state and a disengaged state; wherein, when coils of the motor are de-energized, the brake assembly is in the engaged state to prevent the rotor assembly from rotating in at least one rotational direction; wherein, when the coils of the motor are energized, the brake assembly is in the disengaged state such that the rotor assembly is free to rotate.

Aspect 20. The electric motor-brake assembly of Aspect 19, wherein the brake assembly is spring biased towards the engaged state.

Aspect 21. The electric motor-brake assembly of Aspect 20, further comprising:
a spring pack disposed between the motor housing and the bearing assembly.

Aspect 22. The electric motor-brake assembly of any of Aspects 19 to 21, wherein the rotor assembly is axially displaceable between a first axial position and a second axial position, wherein the brake assembly is in the engaged state in the first axial position and is in the disengaged state in the second axial position.

Aspect 23. The electric motor-brake assembly of any of Aspects 19-22, wherein the brake assembly is located radially between the rotor assembly and the stator assembly.

Aspect 24. The electric motor-brake assembly of Aspect 22, wherein the brake assembly is a friction pack including a plurality of rotor plates assembled to a spline on the clutch assembly and a plurality of stator plates assembled to a spline on the stator housing.

Aspect 25. The electric motor-brake assembly of any of Aspects 19-24, further comprising: a bearing assembly including a first bearing assembly located at a first axial end of the rotor assembly and a second bearing assembly located at a second axial end of the rotor assembly.

Aspect 26. The electric motor-brake assembly of any of Aspects 19-25, wherein the rotor assembly is disposed within an interior area defined by the stator assembly.

Aspect 27. The electric motor-brake assembly of any of Aspects 19-26, wherein the brake assembly is disposed within an interior area defined by the rotor assembly.

Aspect 28. The electric motor-brake assembly of any of Aspects 19-27, wherein the rotor assembly and stator assembly are constructed and arranged to form an permanent magnet.

Aspect 29. The electric motor-brake assembly of any of Aspects 19-28, further comprising a stator housing secured to the motor housing.

Aspect 30. The electric motor-brake assembly of any of Aspects 19-29, further comprising: a clutch assembly disposed between the brake assembly and the rotor assembly; wherein, when the brake assembly is in the engaged state, the clutch assembly allows the rotor assembly to rotate in a first rotational direction and prevents the rotor assembly from rotating in a second rotational direction.

Aspect 31. A control surface actuation system for an aircraft, the control surface actuation system comprising: a control surface; an operating member connected to the control surface; an electric motor assembly configured and arranged to drive the operating member, the electric motor assembly comprising: a housing; an output shaft operably engaged with the operating member; a rotor assembly disposed within the housing, the rotor assembly driving the output shaft; a stator assembly disposed within the housing; a brake assembly disposed within the housing, the brake assembly being operable between an engaged state and a disengaged state; wherein, when coils of the motor are de-energized, the brake assembly is in the engaged state to prevent the output shaft from rotating in at least one rotational direction to fix a position of the control surface; wherein, when the coils of the motor are energized, the brake assembly is in the disengaged state such that the output shaft is free to rotate.

Aspect 32. The control surface actuation system of Aspect 31, wherein the control surface is a spoiler of an aircraft.

What is claimed is:

1. An electric motor-brake assembly comprising:
   a) a housing;
   b) a rotor assembly disposed at least partially within the housing, an output shaft operably coupled with the rotor assembly;
   c) a stator assembly disposed at least partially within the housing; and
   d) a brake assembly disposed within the housing, the brake assembly being operable between an engaged state and a disengaged state, wherein the brake assembly is located radially in between the rotor assembly and the stator assembly; wherein the brake assembly is a friction pack including a plurality of rotor plates assembled to a spline on the rotor assembly and a plurality of stator plates assembled to a spline on the stator assembly;
   e) wherein, when coils of the stator assembly are de-energized, the brake assembly is in the engaged state to prevent the rotor assembly from rotating in at least one rotational direction;
   f) wherein, when the coils of the stator assembly are energized, the brake assembly is in the disengaged state such that the rotor assembly is free to rotate;
   g) wherein the friction pack is positioned radially inward from the coils or radially outward from the coils, such that the coils and the friction pack extend longitudinally along a common portion of the shaft.

2. The electric motor-brake assembly of claim 1, wherein the brake assembly is spring biased towards the engaged state.

3. The electric motor-brake assembly of claim 2, further comprising:
   a) a spring pack disposed between the housing and the bearing assembly.

4. The electric motor-brake assembly of claim 1, wherein the rotor assembly is axially displaceable between a first axial position and a second axial position, wherein the brake assembly is in the engaged state in the first axial position and is in the disengaged state in the second axial position.

5. The electric motor-brake assembly of claim 1, further comprising:
   a) a bearing assembly including a first bearing assembly located at a first axial end of the rotor assembly and a second bearing assembly located at a second axial end of the rotor assembly.

6. The electric motor-brake assembly of claim 1, wherein the rotor assembly is disposed within an interior area defined by the stator assembly.

7. The electric motor-brake assembly of claim 1, wherein the brake assembly is disposed within an interior area defined by the rotor assembly.

8. The electric motor-brake assembly of claim 1, further comprising:
   a) an output shaft operably coupled with the rotor assembly;
   b) wherein the stator assembly is located radially between the output shaft and the rotor assembly.

9. The electric motor-brake assembly of claim 1, wherein the output shaft is operably coupled to the rotor assembly by a wave gearing arrangement.

10. The electric motor-brake assembly of claim 1, further comprising:
    a) a clutch assembly disposed between the brake assembly and the rotor assembly;
    b) wherein, when the brake assembly is in the engaged state, the clutch assembly allows the rotor assembly to rotate in a first rotational direction and prevents the rotor assembly from rotating in a second rotational direction.

11. The electric motor-brake assembly of claim 10, wherein the clutch assembly is a sprag clutch assembly.

12. A control surface actuation system for an aircraft, the control surface actuation system comprising:
    a) a control surface;
    b) an operating member connected to the control surface;
    c) the electric motor-brake assembly of claim 1 coupled to the operating member.

13. The control surface actuation system of claim 12, wherein the control surface is a spoiler of an aircraft.

14. An electric motor-brake assembly comprising:
    a) a motor housing;

b) a rotor assembly disposed within the motor housing and being axially displaceable between a first position and a second position;
c) a stator assembly disposed within the motor housing;
d) a bearing assembly rotatably supporting the rotor assembly;
e) a friction pack disposed within the motor housing, wherein the friction pack is located radially in between the rotor assembly and the stator assembly; wherein the friction pack including a plurality of rotor plates assembled to a spline on a clutch assembly and a plurality of stator plates assembled to a spline on a stator housing; and
f) a spring pack biasing the rotor assembly in a direction towards the friction pack;
g) wherein, when the stator is de-energized, a spring force provided by the spring pack holds the rotor assembly in the first position and in engagement with the friction pack to prevent the rotor assembly from rotating in at least one rotational direction;
h) wherein, when the stator is energized, the rotor assembly is moved relative to the stator assembly into the second position against the spring force of the spring pack and out of engagement with the friction pack such that the rotor assembly is free to rotate;
i) wherein, when the brake assembly is in the engaged state, the clutch assembly includes a first part, and a second part configured to allow the rotor assembly to rotate in a first rotational direction and prevents the rotor assembly from rotating in a second rotational direction.

15. The electric motor-brake assembly of claim 14, further comprising:
a) an output shaft operably coupled with the rotor assembly;
b) wherein the stator assembly is located radially between the output shaft and the rotor assembly.

16. The electric motor-brake assembly of claim 15, wherein the output shaft is operably coupled to the rotor assembly by a wave gearing arrangement.

17. An electric motor-brake assembly comprising:
a) a motor housing;
b) a rotor assembly disposed within the motor housing and being axially displaceable between a first position and a second position;
c) a stator assembly disposed within the motor housing;
d) a bearing assembly rotatably supporting the rotor assembly;
e) a friction pack disposed within the motor housing, wherein the friction pack is located radially in between the rotor assembly and the stator assembly; wherein the friction pack including a plurality of rotor plates assembled to a spline on a clutch assembly and a plurality of stator plates assembled to a spline on a stator housing; and
f) a clutch assembly disposed between the friction pack and the rotor assembly; and
g) a spring pack biasing the rotor assembly in a direction towards the friction pack;
h) wherein, when the stator assembly is de-energized, a spring force provided by the spring pack holds the rotor assembly in the first position and in engagement with the friction pack to prevent the rotor assembly from rotating in a first rotational direction while the clutch assembly allows the rotor assembly to rotate in an opposite second rotational direction;
i) wherein, when the stator assembly is energized, the rotor assembly is moved relative to the stator assembly into the second position against the spring force of the spring pack and out of engagement with the friction pack such that the rotor assembly is free to rotate;
i) an output shaft operably coupled with the rotor assembly; wherein the stator assembly is located radially between the output shaft and the rotor assembly; and wherein the output shaft is operably coupled to the rotor assembly by a wave gearing arrangement.

* * * * *